(12) United States Patent
Ji et al.

(10) Patent No.: US 11,677,470 B2
(45) Date of Patent: Jun. 13, 2023

(54) CONCURRENT SENSING DISTRIBUTED FIBER OPTIC SENSOR PLACEMENT

(71) Applicant: NEC Laboratories America, Inc., Princeton, NJ (US)

(72) Inventors: Philip Ji, Cranbury, NJ (US); Ting Wang, West Windsor, NJ (US); Zilong Ye, La Verne, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/580,572

(22) Filed: Jan. 20, 2022

(65) Prior Publication Data

US 2022/0263579 A1 Aug. 18, 2022

Related U.S. Application Data

(60) Provisional application No. 63/139,850, filed on Jan. 21, 2021.

(51) Int. Cl.
*H04B 10/272* (2013.01)
(52) U.S. Cl.
CPC .................. *H04B 10/272* (2013.01)
(58) Field of Classification Search
None
See application file for complete search history.

(56) References Cited

U.S. PATENT DOCUMENTS

| | | | | |
|---|---|---|---|---|
| 6,130,875 A | * | 10/2000 | Doshi | H04L 45/28 709/224 |
| 2006/0051090 A1 | * | 3/2006 | Saniee | H04J 14/0257 398/59 |
| 2011/0268439 A1 | * | 11/2011 | Gerstel | H04J 14/0269 398/59 |
| 2016/0182149 A1 | * | 6/2016 | Domníguez López et al. H04B 10/0797 398/28 |
| 2018/0340801 A1 | * | 11/2018 | Kelley | G01H 9/004 |
| 2020/0200592 A1 | * | 6/2020 | Huang | G01M 5/0008 |

* cited by examiner

*Primary Examiner* — David W Lambert
(74) *Attorney, Agent, or Firm* — Joseph Kolodka

(57) ABSTRACT

Aspects of the present disclosure describe a method of placement of sensors for DFOS systems, methods, and structures that advantageously employ concurrent sensing. In sharp contrast to the prior art, our inventive method—a heuristic method based on the Explore-and-Pick (EnP) algorithm, which we call a modified EnP (mEnP) method—includes two procedures. The first procedure of our mEnP method explores all possible sensing fiber routes (both linear and star-like routes) for each node in the given network. The second procedure applies a modified greedy algorithm for minimum set cover to select the minimum set of DFOS assignment to fully cover all the links in the given network.

5 Claims, 5 Drawing Sheets

CONCURRENT SENSING DISTRIBUTED FIBER OPTIC SENSOR PLACEMENT

CROSS REFERENCE TO RELATED APPLICATIONS

This application claims the benefit of U.S. Provisional Patent Application Ser. No. 63/139,850 filed 21 Jan. 2021 the entire contents of which is incorporated by reference as if set forth at length herein.

TECHNICAL FIELD

This disclosure relates generally to distributed fiber optic sensing (DFOS). More particularly, it pertains to distributed fiber optic sensor placement on DFOS facilities that employ concurrent sensing.

BACKGROUND

As will be understood by those skilled in the art, (DFOS) systems and techniques have recently advancing which has enabled network infrastructure(s) to evolve to a new era of Infrastructure as a Sensor (IaaSr) or Network as a Sensor (Naasr). These IaaSr/NaaSr infrastructures not only communications services, but also additional sensing capabilities, applications, and services such as monitoring road and traffic conditions, and monitoring utility infrastructures—among others. Given this importance, improvements in DFOS systems and techniques that facilitate such IaaSr/NaaSr application would represent a welcome addition to the art.

SUMMARY

An advance in the art is made according to aspects of the present disclosure directed to a method of placement of sensors for DFOS systems, methods, and structures that advantageously employ concurrent sensing.

In sharp contrast to the prior art, our inventive method—a heuristic method based on the Explore-and-Pick (EnP) algorithm, which we call a modified EnP (mEnP) method—includes two procedures. The first procedure of our mEnP method explores all possible sensing fiber routes (both linear and star-like routes) for each node in the given network. The second procedure applies a modified greedy algorithm for minimum set cover to select the minimum set of DFOS assignment to fully cover all the links in the given network.

Our inventive mEnP algorithm is distinguished from a basic prior-art EnP algorithm in the first procedure, in that mEnP not only exhausts all possible linear routes for each node, but also generates all possible star-like sensing fiber routes.

BRIEF DESCRIPTION OF THE DRAWING

A more complete understanding of the present disclosure may be realized by reference to the accompanying drawing in which:

FIG. 1(A), DFOS w/o concurrent sensing; and FIG. 1(B), DFOS with concurrent sensing according to aspects of the present disclosure;

Figure 1B:
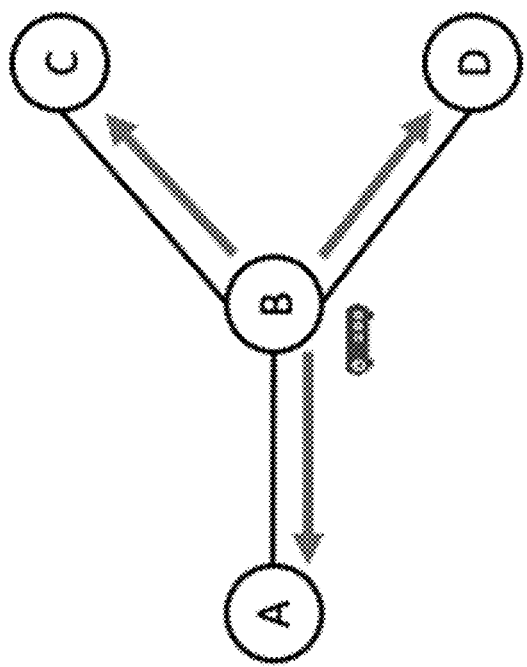
FIG. 1(A), and FIG. 1(B) are schematic diagrams show illustrative.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems have found widespread acceptance in numerous applications including—but not limited to—infrastructure monitoring, intrusion detection, and earthquake detection.

The distributed fiber optic sensing (DFOS) technique has advanced rapidly in the past few years, which enabled network infrastructures to evolve into a new era of Infrastructure as a Sensor (IaaSr) or Network as a Sensor (NaaSr) operation. The IaaSr/NaaSr infrastructures can provide not only communication services but also additional sensing applications and services including monitoring road/highway conditions and traffic and monitoring the utility and other infrastructures.

Those skilled in the art will understand and appreciate that in the past, DFOS sensing techniques have provided sensing services for a single channel in a single direction. However, a more recent DFOS technique has been shown to provide concurrent sensing of multiple channels in different directions simultaneously. These DFOS concurrent sensing techniques can advantageously increase the flexibility of DFOS sensor placement and achieve a smaller cost of sensors such that a full coverage of an entire network infrastructure is possible, as compared to exiting DFOS techniques that operate without concurrent sensing.

Figure 1A:
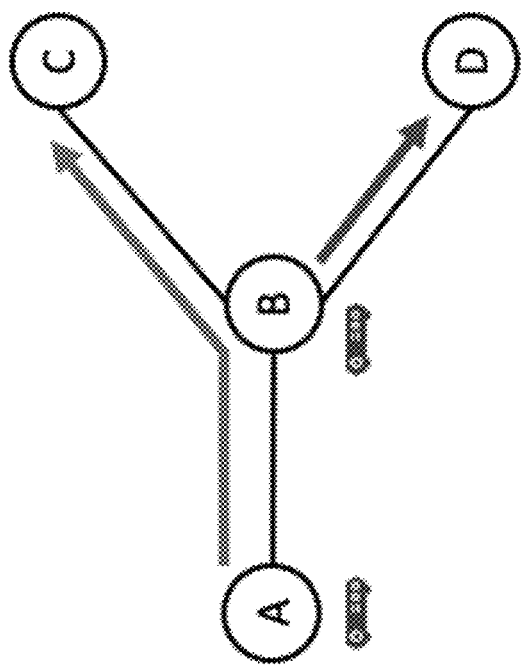

Some advantages of DFOS with concurrent sensing are illustrated in FIG. 1(A), and FIG. 1(B), which are schematic diagrams showing illustrative: FIG. 1(A), DFOS w/o concurrent sensing; and FIG. 1(B), DFOS with concurrent sensing according to aspects of the present disclosure.

In the illustrative example shown in the figure, a DFOS sensor has a sensing range limit of 80 km (which is the existing record), and each network link is 25 km. To fully cover all network links with sensing services, DFOS w/o concurrent sensing (FIG. 1(A)) results in using at least two DFOS sensors (one at Node A and the other at Node B). Even though the sensing fiber route originated at Node A still has 30 km sensing resource (e.g., sensing fiber route A-B-C is 50 km), it is still necessary to deploy a second DFOS sensor at Node B to sense link B-C—because traditional DFOS w/o concurrent sensing can only allow sensing to be performed in a single channel and a single direction.

As a comparison, in FIG. 1(B), the DFOS concurrent sensing technique illustrated leads to a deployment that requires a smaller sensor cost, e.g., only one sensor is used at Node B, because DFOS concurrent sensing allows sensing to be performed in multiple channels and multiple directions as long as the total sensing distance (e.g., the total distance of B-A, B-C, B-D is 75 km) is less than (smaller than) the sensing range limit (80 km).

With this understanding, we note that according to aspects of the present disclosure, describe a method to efficiently deploy DFOS sensors that have concurrent sensing capability. To further understand our inventive method, we are given a network infrastructure G(V, E), where V is the set of end nodes that can be equipped with DFOS sensors, and E is the set of optical fiber links that connects those end nodes. The problem is to find out (1) where to place the sensors, (2) how to determine the route of the sensing channel for each sensor and (3) how to determine the sensing range for each sensing channel, with the objective of consuming the minimum number of sensors while all the optical fiber links in G can be covered. We note that here, each DFOS sensor can concurrently sense multiple channels in multiple directions when the total sensing distance is within the sensing range limit R (e.g., 80 km). Hence, the sensing fiber route can be in a manner of either linear route or star-like route (e.g., the one shown in FIG. 1(B)), which is more flexible and may introduce a smaller cost in terms of the number of sensors used.

So far, there is no known prior-art solution for the above-noted problem of efficiently placing DFOS sensors that have concurrent sensing capability. In this disclosure, we provide a novel procedure to solve this problem. As we shall show and describe, our inventive procedure determines where to place sensors, as well as any routing and sensing range of a sensing channel (either in a linear route format or in a star-like route format that is due to the use of DFOS concurrent sensing), to provide full coverage of all optical fiber links in a network infrastructure, while—at the same time—achieving a minimum cost of sensors.

Briefly, our inventive procedure involves two sub-procedures. The first sub-procedure explores all possible sensing fiber routes S that originates from each node in each network infrastructure G. This set S includes all possible linear routes and star-like routes that originate from each node in G. The second sub-procedure is a modified greedy set cover method that determines a subset of S that is a minimum set of sensing fiber routes that can cover all optical fiber links E in a given network infrastructure G.

As will become apparent to those skilled in the art, our inventive procedure achieves an efficient deployment of sensors while achieving a full IaaSr service coverage in a given network infrastructure. Additionally, our inventive procedure provides location information about where to place sensors to achieve a full IaaSr service coverage in a telecommunication network infrastructure. Advantageously, our inventive procedure determines routing of sensing channel(s) to achieve full IaaSr service coverage, where the sensing fiber route can be either in a linear route or in a star-like route, the latter of which is due to the use of DFOS concurrent sensing. Finally, our inventive procedure determines a sensing range for each sensing channel to achieve full IaaSr service coverage.

The Procedure for DFOS Placement

Figure 2:
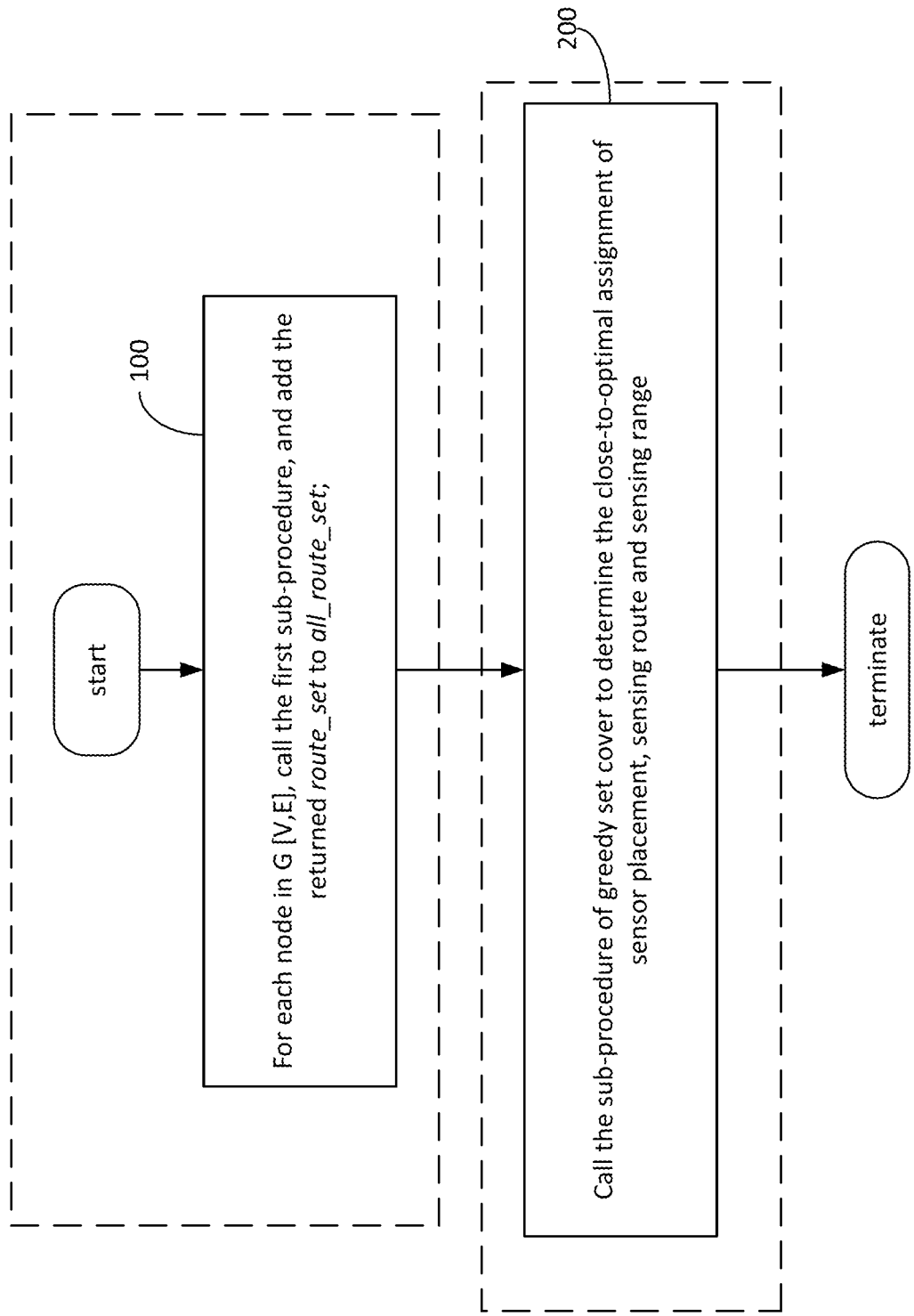
FIG. 2 is a flow diagram illustrating an overall operation according to aspects of the present disclosure.

As noted previously, our inventive method includes two main procedural steps—which we conveniently denote as step 100 and step 200 in FIG. 2.

Figure 3:
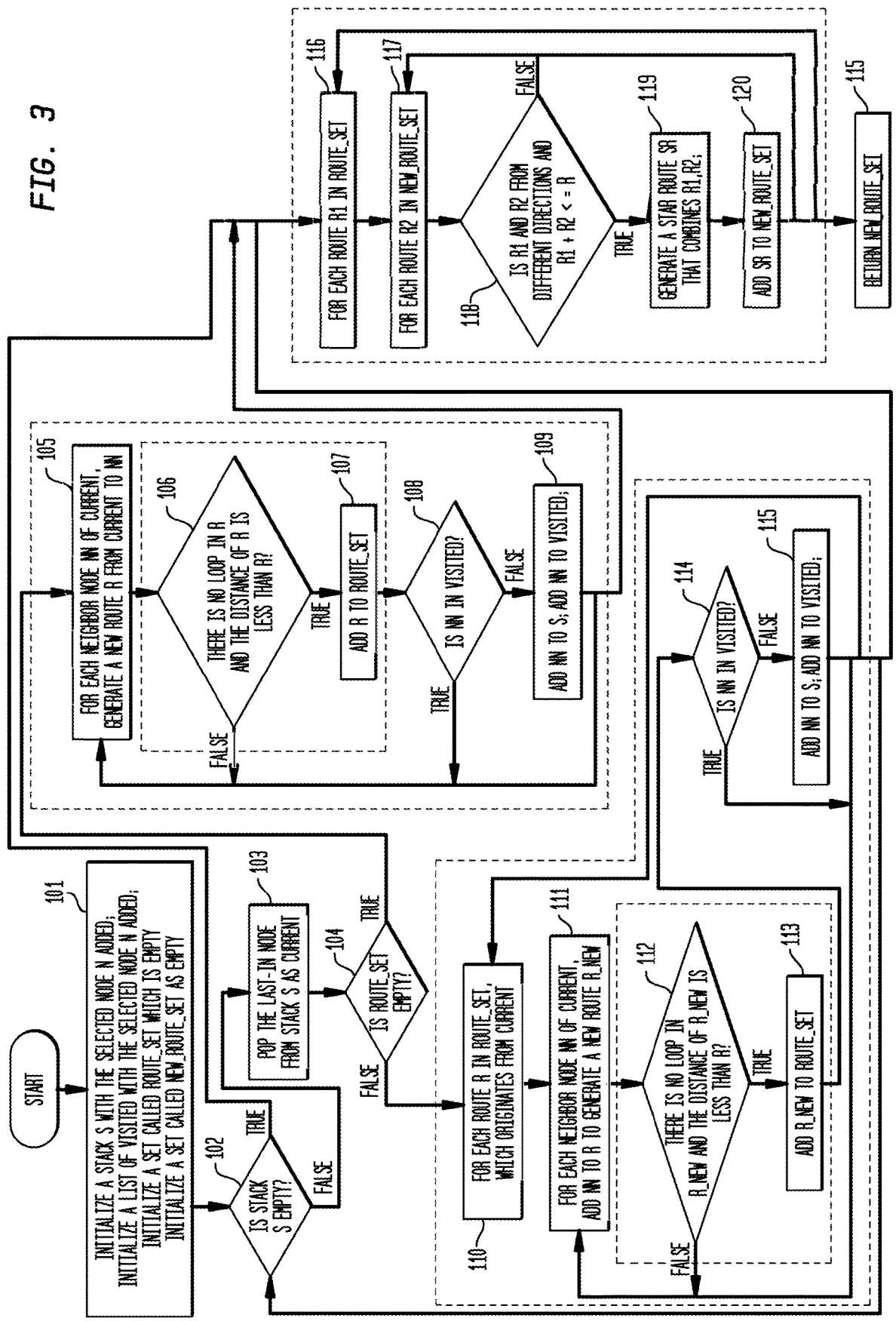
FIG. 3 is a flow diagram illustrating a first procedure of our operation according to aspects of the present disclosure.

At Step 100, this step is the first sub-procedure, which is denoted by the depth-limited route exploration. Note that all the detailed steps in this first sub-procedure are detailed from step 101 to step 121 in FIG. 3. As an overview, this Step 100 includes a for-loop iteration that for each node n in the given network infrastructure G(V, E), a depth-limited route exploration sub-procedure is called to obtain all possible sensing routes (denoted by route_set) for node n if we deploy a sensor on it. Iteratively, each node's route_set will be obtained and added to a set called all_route_set, which contains all the possible assignments for sensor placement, sensing route and sensing range. When all the nodes have been checked and their corresponding route_sets have been added to all_route_set, the process proceeds to Step 200. Set all_route_set will be used as input to Step 200.

Figure 4:
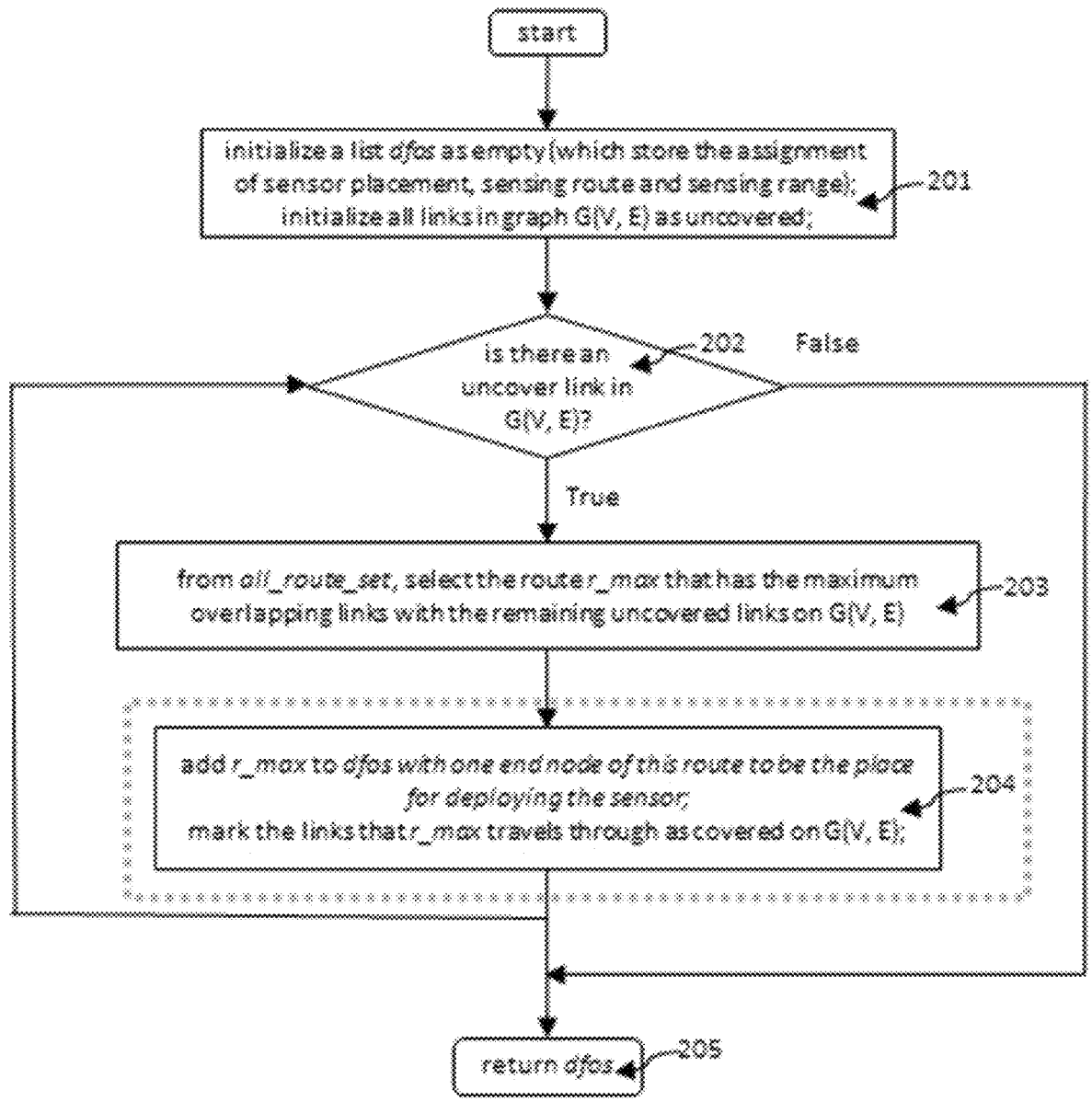
FIG. 4 is a flow diagram illustrating a second procedure of our operation according to aspects of the present disclosure.

At Step 200—which is the second sub-procedure—is denoted by greedy set cover. Note that all the detailed steps in this second sub-procedure are explained from step 201 to step 205 as shown in FIG. 4. From all the possible sense routing all_route_set, this second sub-procedure will adopt a greedy set cover method and determines a close-to-minimum subset that ensures every link in the given network infrastructure G(V, E) can be covered at least once.

Step 101 is the initialization step of the sub-procedure of depth-limited route exploration. Three data structures are created and initialized. First, a stack s is created to store all the nodes that need to be visited for the given node n. The stack is initialized with the given node n, and added with additional nodes when the nodes meet certain conditions (see step 106 and 108, and step 112 and 114). Second, a list named visited is initialized to track all nodes that have been visited during the depth-limited route exploration process. This ensures that there is no duplicated sensing route in a final DFOS assignment. The list is initialized to contain the given node n. Finally, a set called route_set and a set called new_route_set are initialized as empty, which will contain all the possible sensing routes if we deploy a sensor at the given node n. Here the new_route_set_will contain all possible linear and star-like routes.

Step 102 is the entering point of a while loop. It checks if stack s is empty or not. If the stack is not empty, it enters the while loop and continues to step 103. If the stack is empty, it exits the while loop and jumps to step 116 and returns the route_set for the given node n. Here, when the stack is empty, it means that all the neighboring nodes that are within the sensing limit R for the given node n have been checked, so route_set contains all the possible sensing route for the given node n.

Step 103 will pop up the last-in node from stack s, and denote it as node current. This current node shows where the current exploration is located at. Future steps determine whether or not to add current and its neighbors as a possible sensing routes in route_set.

Step 104 checks if set route_set is empty or not. If it is empty, it will consider node current to be the original node of the sensing route and further explore any other possible sensing routes, and proceed to step 105. If route_set is not empty, then it will check the routes from route_set whose predecessor is current, and further explore any other possible sensing routes, as operation proceeds to step 110.

Step 105 is the entering point of a for-loop. It checks each neighbor node nn of current and generates a router from current to nn. This route is checked in step 106 to determine whether or not it is added to route_set.

Step 106 checks the condition of route r that is extended from current to nn. The condition is that route r must be a linear route that contains no loop, and in the meantime, the distance traveled by r is less than the sensing range limit R. If route r satisfies the above condition, we will add r to route_set as shown in step 107. If the condition is not met, the procedure will go back to step 105 and check the next neighbor node and its corresponding newly generated route.

Step 107 adds route r to the set of route_set.

Step 108 checks if neighbor node nn has been visited or not. If nn has been visited before, then control returns to step 105 and checks the next neighbor node. If nn has not been visited, then control continues at step 109.

Step 109 adds neighbor node nn to stack s, which allow further exploration of other possible sensing routes extended from this node. In this step, it also adds nn to the list of visited.

Step 110 is executed when the condition of step 104 is not met. It is the entering point of the outer loop of a double for-loop. Here, the operation checks each existing sensing route r in the set of route_set, and proceeds with ones that originate from node current.

Step 111 is the entering point of an inner loop of a double for-loop. It checks each neighbor node nn of current and generates a new route r_new that is constructed by adding node nn to existing sensing route r.

Step 112 checks whether or not route r_new is a linear route without a loop, and in the meantime, the distance traveled by r_new is less than the sensing limit R. If the above condition holds true, then operation proceeds at step 113, where r_new is added to route_set. If the condition is not met, the procedure returns to step 111 and checks the next neighbor node and its corresponding newly generated route.

Step 113 adds the route r_new to the set of route_set.

Step 114 checks if neighbor node nn has been visited or not. If nn has been visited before, then control returns to step 111 and checks the next neighbor node. If nn has not been visited, then control proceeds at step 115.

Step 115 adds neighbor node nn to stack s, which allows further exploration of any other possible sensing routes extended from this node. In this step, nn is added to the list of visited.

Step 116 is the entering point of an outer for-loop. It checks each route in route_set, which is denoted by r1.

Step 117 is the entry point of an inner for-loop. It checks each route in new_route_set, and excludes those from the outer for-loop in step 116. The route that is checked is denoted by r2.

Step 118 checks if r1 and r2 are eligible to form a new star-like route. If they are from different directions and their total sensing distance combined is less than or equal to the sensing limit range R, then they are combined as a star-like route and considered for final DFOS assignment, and the process continues at step 119; if they are not from the same direction, then control returns to step 117 and checks the next route.

Step 119 generates a new route that is the combination of r1 and r2. Since r1 and r2 are in different directions or branches, their combination is a star-like route, and the newly generated route is denoted as sr, and control proceeds at step 120.

Step 120 adds the newly generated route sr to new_route_set, and returns to the inner for loop in step 117 if there are still routes that have not been checked in step 117; if all the steps in 117 have been checked, then the procedure will return to the outer for loop in step 116; if all the routes in step 116 have been checked, then the procedure will continue at step 121.

Step 121 returns set new_route_set to the location in the overall procedure where the procedure was called in the first sub-procedure in step 100.

Step 201 initializes the second sub-procedure. Two data structures are created. First, this step initializes a list called dfos as empty. This list stores the assignment of distributed fiber optical sensor placement, including the sensor placement assignment, the sensing route assignment and the sensing range assignment. Second, it initializes each link in G(V, E) to be in the state of uncovered.

Step 202 is the entering point of a while loop and checks if there exists a link in G(V, E) that is still marked as uncovered. If this condition is true, operation proceeds at step 203; otherwise, it proceeds to step 205 and returns dfos. Here, if there still exist uncovered links in G(V, E), more sensors are deployed to cover those links, which is reason why operation proceeds to the while loop body in step 203. This ensures that the procedure terminates when the whole network infrastructures are fully covered by distributed fiber optical sensors.

Step 203 selects the route r_max from all_route_set, which has the maximum overlapping or common links with the remaining uncovered links in G(V, E). This is a greedy method that achieves coverage of all the links in G(V, E) with the minimum subset from all_route_set.

Step 204 adds the selected most overlapping route r_max to the list of dfos. In addition, one of the two end nodes on route r_max is selected as a location to place a sensor. Lastly, this step marks links that are traveled by r_max as covered on the G(V, E).

Step 205 is executed when the while loop condition in step 202 is false. In other words, when all the links in G(V, E) are covered by the distributed fiber optical sensor assignment in dfos, the procedure terminates and returns dfos. Note that the distributed fiber optical sensor assignment result are stored in dfos.

The Application of the DFOS Placement Procedure

Figure 5:
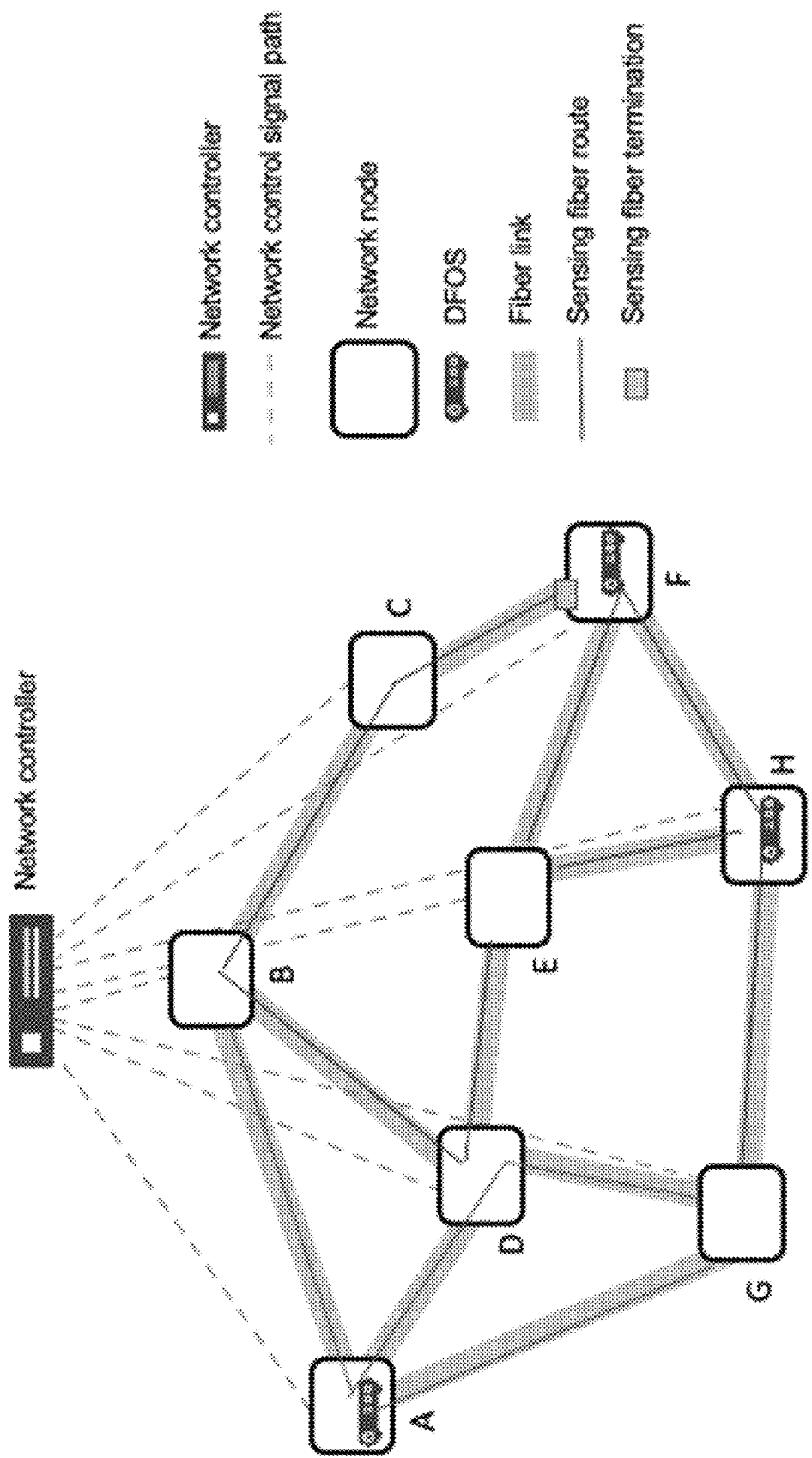
FIG. 5 is a schematic diagram illustrating a application of a DFOS placement procedure in an fiber optic sensing network according to aspects of the present disclosure.

FIG. 5 is a schematic diagram that shows illustratively an application of our DFOS placement procedure according to aspects of the present disclosure.

As may be observed from the figure, there are multiple nodes in the fiber optic network, and there are multiple fiber optic links between certain nodes. The fiber optic links are those links that need to be monitored (sensed) by the DFOS sensors (it could be all fiber optic links in the network).

These optical nodes are controlled by a network controller, which can be placed at one of the nodes, or can be in a remote location or multiple locations. The network information, including the network topology, information of each node, information of each link (such as the two end nodes, the link distance, whether sensing is required on this link), and so on, are collected by the network controller. Based on the information, the network controller uses the DFOS placement procedure to determine the network configuration for sensing purposes. The configuration settings are then sent to individual nodes.

When an optical node receives its respective network configuration instructions, it executes the instructions, which may include placing one or more DFOS sensor hardware (with or without concurrent sensing capability) at the node and connecting them to the respective sensing fiber, and/or connect two fibers from two links in a single direction to form a linear route or in different directions to form a star-like route. In FIG. 5, the DFOS sensor at Node F performs basic sensing that introduces a sensing fiber route that is in a linear route FCBDE. While the DFOS sensor at Node A and Node H perform concurrent sensing and their corresponding sensing fiber routes are in a star-like routes, which are AB-ADG-AG and HG-HE-HFE, respectively.

Each deployed DFOS sensor also use the instruction from the network controller to configure the sensing distance and any related parameters, then start the on-going measurement. The collected data are separated into individual links, if the sensor's sensing range spans across multiple hops. The measure data for each fiber link can be stored and processed locally or can be sent to remote or centralized processor to be analyzed or stored.

Due to the resource optimization advantage of the DFOS placement procedure, the number of DFSO sensors in the network can be kept low, saving the hardware expense and the operation cost. Since all the required links in the network are performing sensing function continuously, the IaaSr (NaaSr) function is achieved, which will improve the network operation efficiency (such as preventing cable cut, monitoring cable health, monitoring operation environment), and bring new service and revenue to the network owner (such as providing traffic information to municipal government, monitoring road condition for highway operator, monitoring utility pole health for utility company, monitoring city noise for accident detection, etc.)

At this point, while we have presented this disclosure using some specific examples, those skilled in the art will recognize that our teachings are not so limited. Accordingly, this disclosure should be only limited by the scope of the claims attached hereto.

The invention claimed is:

1. A method of determining sensor placement, sensing route assignment, and sensing range in a distributed fiber optic sensing (DFOS) network, said method comprising:
   for each end node n in a sensing infrastructure network G(V,E) where V is a set of end nodes that are equipped with DFOS sensors having concurrent sensing capabilities, E is a set of optical fiber links that connect the set of end nodes V,
   performing a depth-limited route exploration procedure to determine all possible sensing routes for node n if a DFOS sensor having concurrent sensing capability is deployed therein; and
   performing a greedy set cover procedure to determine from the determined all possible sensing routes, a subset having every link in the sensing infrastructure network G(V,E) sensed during a DFOS operation.

2. The method of claim 1 wherein the determined all possible sensing routes is a minimum set of sensing routes that are sensed during the DFOS operation.

3. The method of claim 2 wherein each sensing route in the subset of sensing routes contains no loop and a distance of the route is less than a sensing range limit for a sensor.

4. The method of claim 3 wherein all routes having a star topology are considered for a given network node.

5. The method of claim 4 wherein each sensing route has two ends and a sensor is placed at either end of a determined sensing route.

* * * * *